(No Model.)

E. B. BUCHANAN.
DOUBLE SHOVEL PLOW.

No. 368,871. Patented Aug. 23, 1887.

Witnesses
R. F. Gardner
Edm. P. Ellis

Inventor
E. B. Buchanan,
per J. A. Lehmann,
Atty.

UNITED STATES PATENT OFFICE.

EDWARD B. BUCHANAN, OF TULLAHOMA, TENNESSEE.

DOUBLE-SHOVEL PLOW.

SPECIFICATION forming part of Letters Patent No. 368,871, dated August 23, 1887.

Application filed May 31, 1887. Serial No. 239,873. (No model.)

*To all whom it may concern:*

Be it known that I, EDWARD B. BUCHANAN, of Tullahoma, in the county of Coffee and State of Tennessee, have invented certain new and useful Improvements in Double-Shovel Plows; and I do hereby declare the following to be a full, clear, and exact description of the invention, such as will enable others skilled in the art to which it pertains to make and use it, reference being had to the accompanying drawings, which form part of this specification.

My invention relates to an improvement in double shovel plows; and it consists in the combination, with the two beams, of a pivoted adjustable coupling at their front ends and an adjustable coupling near their rear ends, whereby the rear ends of the two beams are allowed a vertical movement independent of each other, all of which will be more fully described hereinafter.

The object of my invention is to provide two couplings that are applied at opposite ends of the beams of a double shovel plow, and which will enable the operator to lift either one of the plows, irrespective of the other, and at the same time form a rigid and durable coupling.

Figure 1:
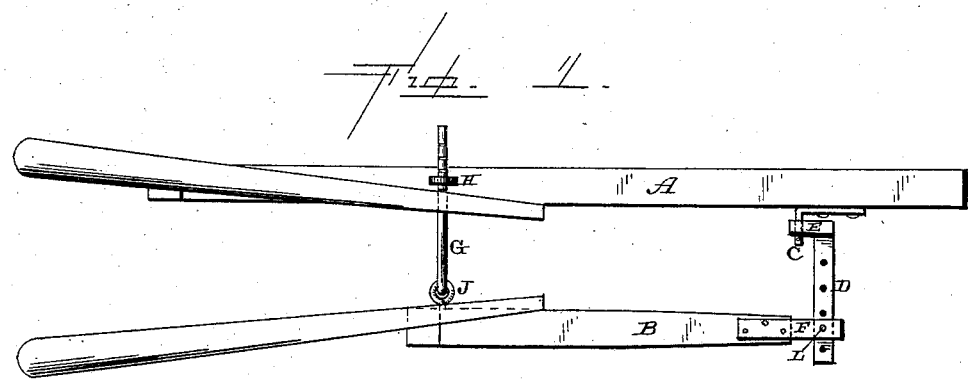
Figure 2:
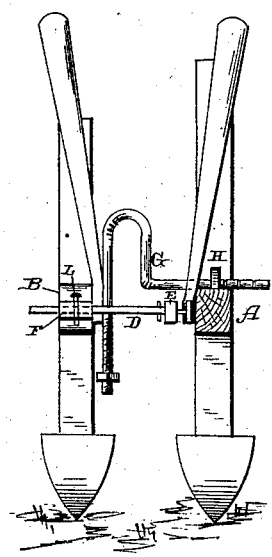

Figure 1 is a plan view of a plow embodying my invention. Fig. 2 is a front elevation.

A B represent the beams of two ordinary shovel-plows having standards, to which the plows are attached in the usual manner. The front ends of the two beams are connected together by means of the wrist-pin or pivot C, secured to the beam A near its front end, and the metallic plate D, which has a shoulder or projection, E, in which the pin C is pivoted and secured by means of a nut or key, as desired. The plate D passes through the clip or clevis F, which is secured to the front end of the beam B, and is provided with perforations, so that it may be adjusted back and forth therein, and held in any desired position by means of a bolt, L.

The rear ends of the two beams A B are secured together by the bar G, which has one end passing through the eye H and its other end through the eye J upon the beam B. This rod or bar G is bent upward a suitable distance and doubled upon itself and passes down through the eye J, as shown. That end of the bar passing through the eye H is provided with recesses, which enable it to be rigidly held where adjusted by means of the eye J, which passes through the beam A and has a nut upon its lower end for tightening or loosening the eye upon the bar. By means of this construction the two plows can be readily adjusted any desired distance apart, as may be required in the cultivation of different kinds of plants. The front end of the beam B being pivoted to the beam A and the rear end allowed a vertical movement upon the rod or bar G, it will be seen that while the two plows are rigidly held at any desired distance apart, yet they can be raised or lowered at their rear ends independently of each other.

Having thus described my invention, I claim—

1. In a double-shovel plow, the combination of the beam A, provided with a pivot, C, near its front end, with the pivoted adjustable coupling D, the beam B, provided with a clip or clevis, F, on its front end and through which the adjustable coupling extends, a pin for connecting the coupling and clevis together, and a bent rod, G, which connects the rear ends of the beams together, substantially as shown.

2. The combination of the two beams A B and the coupling D, for connecting their front ends together, with the bent rod G, having one end serrated and made to extend through an eye, H, secured to the top of one of the beams, and having its other end turned vertically downward, so as to pass through an eye or guide, J, upon the inner side of the beam B, substantially as set forth.

In testimony whereof I affix my signature in presence of two witnesses.

EDWARD B. BUCHANAN.

Witnesses:
W. N. COFFIN,
D. I. SMITH.